United States Patent [19]

Lundberg et al.

[11] 4,157,992

[45] Jun. 12, 1979

[54] ELASTOMERIC BLEND COMPOSITIONS HAVING IMPROVED WEATHERING STABILITY

[75] Inventors: Robert D. Lundberg, Bridgewater; Robert R. Phillips, Spring Lake Heights, both of N.J.

[73] Assignee: Exxon Research & Engineering Co., Florham Park, N.J.

[21] Appl. No.: 855,773

[22] Filed: Nov. 29, 1977

[51] Int. Cl.$^2$ .............................................. C08L 91/00
[52] U.S. Cl. ...................... 260/23.5 A; 260/23.7 M; 260/31.2 R; 260/33.6 AQ; 260/42.33; 260/42.47; 260/DIG. 31
[58] Field of Search ......... 260/23.7, 23.5 A, 33.6 AQ, 260/33.6 PQ, 28.5 B, 42.33, 42.47, 79.3 R, DIG. 31

[56] References Cited

U.S. PATENT DOCUMENTS

| 3,642,728 | 2/1972 | Canter | 260/79.3 R |
|---|---|---|---|
| 3,974,241 | 8/1976 | Lundberg et al. | 260/897 B |

*Primary Examiner*—Lewis T. Jacobs
*Attorney, Agent, or Firm*—Richard E. Nanfeldt

[57] ABSTRACT

The present invention relates to improved elastomeric blend compositions for injection molding and extrusion application having improved compression set, weathering stability and physical properties, wherein the improved elastomeric compositions include minimally a metal neutralized sulfonated EPDM terpolymer, a nonpolar process oil, an inorganic filler, and a carbon black at critically selected concentration levels. These blend compositions can be readily processed due to their superior rheological properties on conventional plastic fabrication equipment, especially on low pressure injection molding equipment into elastomeric articles having excellent physical properties and desirable rubbery characteristics.

22 Claims, No Drawings

ELASTOMERIC BLEND COMPOSITIONS HAVING IMPROVED WEATHERING STABILITY

FIELD OF THE INVENTION

The present invention relates to improved elastomeric blend compositions for injection molding and extrusion application having improved compression set, weathering stability and physical properties, wherein the improved elastomeric compositions include minimally a metal neutralized sulfonated EPDM terpolymer, a non-polar process oil, an inorganic filler, and a carbon black at critically selected concentration levels. These blend compositions can be readily processed due to their superior rheological properties on conventional plastic fabrication equipment, especially on low pressure injection molding equipment into elastomeric articles having excellent physical properties and desirable rubbery characteristics.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB and VIII and mixtures thereof of the Periodic Table of Elements. Although these sulfonated elastomeric polymers prepared by the process of this patent are readily useable in a certain number of limited applications, they are not as readily adaptable for the manufacture of an injection moldable elastomeric article such as footwear or garden hose by an extrusion process as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties as well as improved weathering stability and compression set properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are not as suitable for the manufacture of high performance elastomeric articles such as footwear formed by an injection molding process as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of the present invention are more adaptable for use in the manufacture of high performance elastomeric articles.

Products resulting from the aforementioned methods for obtaining neutralized sulfonated elastomeric compositions, possess either unsuitable rheological or physical properties as well as inferior weathering stability and compression set for the applications envisioned in the present invention.

For example, the physical properties of these resultant sulfonated elastomeric products of these aforementioned patents are unsuitable for a major application of an injection molding process, namely the manufacture of footwear, or the manufacture of garden hose by an extrusion process wherein excellent resilience, dimensional stability, good compression set, excellent low and high temperature flexibility, excellent weathering stability, excellent flex fatigue, and good abrasion are needed. Furthermore, the high melt viscosity and melt elasticity of these materials makes injection molding difficult if not impossible. These materials of the aforementioned patents which are generally processable by only compression molding have marginally satisfactory physical properties, compression set and weathering stability for these major applications of footwear and garden hose. The present invention provides improvements over those materials.

The materials cost of the compositions of the instant invention is substantially reduced over those of the aforementioned patents, wherein these previous patents failed to realize the criticality of the proper selection of the chemical and physical uniqueness of the basic elastomeric backbone, the degree of sulfonation, the proper selection of neutralizing agent in conjunction with plasticization, and the critical selection of an extenders ability to extend these sulfonated polymers with a mixture of a nonpolar process oil and inorganic filler and carbon black. Unsulfonated elastomers, when extended with oils and fillers, show a general deterioration in physical and rheological properties as well as weathering stability as is clearly shown in the Detailed Description of the present invention. Quite surprisingly, through the proper selection of nonpolar process oil, inorganic filler and carbon black within a critical ratio of filler to oil, the sulfonated elastomeric composition of the present invention shows a marked improvement in both rheological and physical properties as well as compression set properties and weathering stability.

The use of ultraviolet stabilizers is well known in the elastomeric and polymeric art fields. However, the use of ultraviolet stabilizers in the preparation of sulfonated elastomeric blend compositions for extrusion and injection molding compositions results in a general significant deterioration of physical properties due to the excessively large amounts of stabilizer needed in order to obtain suitable weathering stability with the instant sulfonated elastomers.

Compression set is a second significant drawback of nearly all sulfonated elastomer based thermoplastic elastomer compounds. For most rubbery applications compression set values at room temperature of about 20 to 30% would be desirable for this would suggest a good recovery from a long term deformation. Sulfo EPDM compounds generally possess compression set values on the order of 50% ± 10%. The incorporation of a UV stabilizer can further exacerbate the set behavior of these systems to an extent that values of 60 to 70% are achieved. This is unacceptable for many applications.

The unique and novel improved compositions of the present invention overcome the deficiencies of the aforementioned U.S. patents and applications from both a rheological and physical properties aspect as well as providing excellent compression set properties and improved weathering stability. The blend compositions of the present invention solve the problem of having a material which has both desirable rheological and physical properties for the manufacture of an elastomeric article as an elastomeric footwear or garden hose wherein the extrudate of the resultant compositions do not exhibit early melt fracture during extrusion processing as is the case in some of the aforementioned patents and provides an elastomeric article having both improved compression set properties and weathering stability.

SUMMARY OF THE INVENTION

It has been found surprisingly that compositions formed from blends of a metal neutralized sulfonated elastomeric material, in particular a select class of neutralized sulfonated elastomeric polymers, inorganic fillers, a non-polar process oil, a carbon black, and a preferential plasticizer have suitable rheological and physical properties for the formation of an elastomeric article, namely a footwear by a low pressure injection molding process or garden hose by an extrusion process having both improved weathering stability and compression set properties.

Accordingly, it is an object of our present invention to provide unique and novel compositions of matter for producing a high performance elastomeric article by a low pressure injection molding process or extrusion process wherein the compositions of the elastomeric article have both improved weathering stability and compression set properties.

It is the object of the instant invention to describe a class of compounds based on sulfonated ethylenepropylene terpolymers which can be processed on plastics type extrusion equipment at high rates and which possess improved physical characteristics such as compression set and weathering stability. One of the essential aspects of the present invention comprises the discovery that only a restricted class of the subject sulfonated elastomers may be readily employed for low pressure injection molding or extrusion fabrication. The restrictions are primarily associated with processing and product performance characteristics such as compression set and weathering stability. These characteristics are critically modulated by the type and concentration of various compounding ingredients. The compositions of the instant invention will, therefore, involve a class of compositions based on a restrictive class of sulfonated elastomers extended with a critical selected mixture of a non-polar process oil, an inorganic filler and a carbon black.

GENERAL DESCRIPTION

This present invention relates to unique and novel blend compositions of a metal neutralized sulfonated elastomeric polymer, an inorganic filler, a non-polar process oil and a carbon black, wherein the resultant composition has a viscosity at 0.73 sec$^{-1}$ at 200° C. of less than about $5 \times 10^5$ poises, wherein the compositions are readily processable in a conventional injection molding process or extrusion process into a high performance elastomeric article such as footwear or garden hose. The resultant elastomeric articles have both good compression set properties and weathering stability heretofore simultaneously untenable.

Various critically selected additives can be incorporated into the blend compositions such as a polyolefin thermoplastic for further modification of hardness as well as rheological properties, a lubricant for improvement of the physical appearance such as shine of the finished footwear as well as the ability to easily eject the formed article from the mold during the injection molding process.

The neutralized sulfonated elastomeric polymer of this present instant invention are derived from unsaturated polymers which are EPDM terpolymers.

The EPDM terpolymers are low unsaturated polymers having about 1 to about 10.0 wt. % olefinic unsaturation, more preferably about 2 to about 8, most preferably about 3 to 7 defined according to the definition as found in ASTM- D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g. 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 40 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (duPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

In carrying out the invention, the EPDM terpolymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the EPDM terpolymer and non-reactive solvent at a temperature of about −100° C. to about 100° C. for a period of time of about 1 to about 60 minutes, most preferably at room temperature for about 5 to about 45 minutes, and most preferably about 15 to about 30. Typical sulfonating agents are described in U.S. Pats. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothioplenol, or triethylphosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pre-generated before its addition to the reaction medium in a chlorinated aliphatic or aromatic hydrocarbon.

It should be pointed out that neither the sulfonating agent nor the manner of sulfonation is critical, provided that the sulfonating method does not degrade the polymeric backbone. The reaction is quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated EPDM terpolymer has about 10 to about 100 meq. $SO_3H$ groups per 100 grams of sulfonated polymer, more preferably about 15 to about 50; and most preferably about 20 to about 40. The meq. of $SO_3H/100$ grams of polymer is determined by both titration of the polymeric sulfonic acid and Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated EPDM terpolymer is gel free and hydrolytically stable. Gel is measured by stirring a given weight of polymer in a solvent comprised of 95 toluene-5-methanol at a concentration of 5 wt. % for 24 hours, allowing the mixture to settle, withdrawing a weighted sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated EPDM terpolymer is done by the addition of a solution of a basic salt to the acid form of the sulfonated EPDM terpolymer dissolved in the mixture of the aliphatic alcohol and non-reactive solvent. The basic salt is dissolved in a binary solvent system consisting of water and/or an aliphatic alcohol. The counterion of the basic salt is selected from antimony, aluminum, lead or Groups I-A, II-A, I-B or II-B of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

Examples of metal oxides useful in preparing metal sulfonates are $MgO$, $CaO$, $BaO$, $ZnO$, $Ag_2O$, $PbO_2$ and $Pb_3O_4$. Useful examples of metal hydroxides are $NaOH$, $KOH$, $LiOH$, $Mg(OH)_2$ and $Ba(OH)_2$. The resultant neutralized sulfonated terpolymer has a viscosity at 0.73 $sec^{-1}$ at 200° C. of about $3\times10^5$ poises to about $5\times10^6$ poises, more preferably of about $3\times10^5$ poises to about $3\times10^6$ poises and most preferably about $5\times10^5$ poises to about $3.0\times10^6$ poises.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min. to 20 in/min. The apparent viscosity at 200° C. and at a shear rate of 0.73 $sec^{-1}$ (0.005 in/min.) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the approximate upper shear rate for processing a given material. This is used as a characterization parameter for compounds employed in extrusion processing.

The metal sulfonate containing EPDM terpolymers at the higher sulfonate levels possess extremely high melt viscosities and are thereby difficult to process. The addition of ionic group plasticizers markedly reduces melt viscosity and frequently enhances physical properties.

To the sulfonic acid derivative of the EPDM terpolymer or the neutralized sulfonated EPDM terpolymer is added, in either solution or in crumb form, a preferential plasticizer selected from the group consisting essentially of carboxylic acid having about 5 to about 30 carbon atoms, more preferably about 8 to about 22 carbon atoms, or basic salts of these carboxylic acids wherein the metal ion of the basic salt is selected from the group consisting essentially of aluminum, iron, antimony, lead or Groups I-A, II-A, I-B or II-B of the Periodic Table of Elements and mixtures thereof. The carboxylic acids are selected from the group consisting essentially of lauric, myristic, palmitic, or stearic acids and mixtures thereof; e.g. zinc stearate, magnesium stearate, or zinc laurate.

The preferential plasticizer is incorporated into the neutralized sulfonated EPDM terpolymer at about 0 to about 60 parts per hundred by weight based on 100 parts of the sulfonated polymer, more preferably at about 5 to about 40, and most preferably at about 7 to about 25. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof. The resultant neutralized sulfonated elastomeric polymer with preferential plasticizer is isolated from the solution by conventional steam stripping and filtration.

The resultant neutralized and plasticized sulfonated elastomer has a viscosity at 200° C. and a shear rate of 0.73 sec$^{-1}$ of about $5 \times 10^4$ poise to about $1 \times 10^6$ poise, more preferably of about $5 \times 10^4$ poise to about $8 \times 10^5$ poise and most preferably of about $8 \times 10^4$ poise to about $8 \times 10^5$ poise.

The neutralized sulfonated EPDM terpolymer is blended with at least one inorganic filler, a non-polar backbone process oil, and a carbon black by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The fillers employed in the present invention are selected from talcs, ground calcium carbonate, water precipitated calcium carbonate, or delaminated, calcined or hydrated clays and mixtures thereof. These fillers are incorporated into the blend composition at about 5 to about 300 parts per hundred, more preferably at about 25 to about 200, and most preferably at about 50 to about 150. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
|---|---|---|---|---|---|
| calcium carbonate ground | Atomite | 15 | 2.71 | | 9.3 |
| calcium carbonate precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| magnesium silicate (Talc) | Mistron Vapor | 60–70 | 2.75 | 2 | 9.0–7.5 |

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 SSU at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 1 to about 150 parts per hundred, more preferably at about 5 to about 100, and most preferably at about 10 to about 100.

TABLE II

| Type Oil | Oil Code # | Viscosity SSU | Mn | % Polars | % Aromatics | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Carbon blacks employable in the blend compositions range widely in physical and chemical properties. Physically, they vary in average particle size, particle size distribution, specific surface area, porosity of surface, and the tendency of the individual primary particles to be associated in chain-like structure. Chemically, they vary in the population and nature of oxygenated structures combined with their surface. Typical carbon blacks employed in this invention are illustrated in Table III.

These carbon black fillers are blended into the blend composition at about 1 to about 60 parts per hundred; more preferably at about 2 to about 50; and most preferably at about 3 to about 30.

It is observed in these compounds if the carbon black is increased to a very high level (i.e. > 100 pts. or so) then the resulting fabricated product exhibits a pronounced marking; i.e. a characteristic whereby a fabricated object will impart a black mark when rubbed on a smooth light surface. Therefore systems containing high levels of carbon black are not desired.

lease 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc. are generally included. Polypropylene polymers having intermediate and high densities are the preferred examples of the polypropylene materials useful in the instant invention. These materials will have a density from 0.88

TABLE III

| Carbon Black | Type | Nigrometer Index | Sp. Surface Area, $m^2/g$ | EM Diameter $(dm)A°$ | Volatile % | pH | Total Acids meq/g |
|---|---|---|---|---|---|---|---|
| Black Pearls 46 | Channel | 65 | 800 | 130 | 14.0 | 3.0 | 2.42 |
| Black Pearls 74 | Channel | 74 | 332 | 170 | 5.0 | 5.0 | 0.95 |
| Spheron 9 | Channel | 85 | 105 | 240 | 5.0 | 5.0 | 0.94 |
| Vulcan 9 | Oil Furnace (SAF) | 86 | 124 | 200 | 1.5 | 8.5 | 0.84 |
| Vulcan 3 | Oil Furnace (HAF) | 90 | 74 | 290 | 1.0 | 8.5 | 0.68 |
| Regal 330 | Low Structure Oil Furnace | 84.5 | — | 240 | — | 8.5 | 0.42 |
| Sterling S | Gas Furnace | 99 | 23 | 800 | 1.0 | 9.5 | 0.18 |
| Sterling FT | Thermal (FT) | 107 | 13 | 1800 | 0.5 | 8.5 | 0.12 |
| Sterling MT | Thermal (MT) | 110 | 6 | 4700 | 0.5 | 8.5 | 0.10 |

The inorganic filler to oil ratio in the present instant application is critical and should be about 1.0 to about 5.0, more preferably 1.2 to about 4 and most preferably about 1.3 to about 3.

The inorganic filler to carbon black ratio in the present instant invention is also important and should be about 50 to about 1, more preferably about 50 to about 2, and most preferably about 30 to about 3.

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least to 0.925 gms/cc. The polyethylene of polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of about 0 to about 25 parts per hundred by weight based on 100 parts of sulfonated polymer, more preferably about 0 to about 15. Alternatively, a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 50 parts per hundred based on 100 parts of the neutralized sulfonated elastomeric polymer, wherein the metal ion of the metallic hydroxide is selected from Group IIA of the Periodic Table of Elements such as barium, calcium or magnesium.

A lubricant can be employed in the blend composition at a concentration level of about 0 to about 20 parts per hundred based on 100 parts of the neutralized sulfonated elastomeric polymers, and more preferably about 0 to about 15. The lubricants of the present instant invention are nonpolar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

The mixture of non-polar process oil, inorganic filler and carbon black incorporated into the blend compositions of the present invention, in conjunction with the type of elastomeric polymer, the degree of sulfonation, and the metal counterion of the neutralized sulfonated elastomeric polymer, and the plasticizer give materials processable by extrusion or injection molding processes into elastomeric articles having the desirable physical and rheological properties as well as improved weathering stability and compression set properties. These combined physical properties and rheological processability characteristics in conjunction with improved weathering stability and compression set properties were not previously obtainable in the aforementioned U.S. patents.

A further discovery of this invention is that when the composition described herein are exposed in fabricated form to the Weatherometer for extended periods of time, the resulting products exhibit unusually good compression set (ASTM-B) at room temperature after 30' recovery. It is postulated that this unusual phenomenon is due to a curing reaction which occurs due to the incident radiation. While the measurements described herein are made after 1000 hours exposure, such improvements can be achieved at extremely low exposure times with more intense radiation. Thus, it is feasible to employ such irradiation sources (intense U.V. or viable light) in combination with the fabrication equipment and thereby obtain the desired fabricated object with improved set characteristics as part of the fabrication line.

It is important to note that the achievement of this good weathering resistance, and improved set of the compositions described herein are a consequence of the presence of the carbon black even at the low levels cited. In the absence of the carbon black it is believed that a series of degradative reactions can occur giving rise to compositions having poor physical properties. The presence of carbon black is believed to circumvent the degradative reactions and yet not inhibit the small amount of covalent crosslinking which gives rise to good compression set after irradiation.

DETAILED DESCRIPTION

The advantages of both the rheological and physical properties of the blend compositions of the present invention and improved compression set properties and weathering stability can be more readily appreciated by reference to the following examples and tables. Unless otherwise specified, all measurements are in parts per hundred by weight.

EXAMPLES 1-28

Weatherometer Exposure of Sulfo EPDM 503X and 503XO Compounds with UV 1084 Stabilizer and Carbon Black Two master batch blend compounds using a sulfonate gum containing 45 meq of stearic acid per 100 gms of sulfonated EPDM terpolymer as plasticizer were banbury mixed. These compounds were designed 503X (employing Sunpar 2280 oil in the formulation) and 503XO (Sunpar 180 oil). Formulations are shown in Table IV.

Both compounds were then mixed with UV stabilizer 1084 [2,2¹-thiobis (4-tert-octyl phenolato)-n-butylamine nickel] at levels of 0.5, 1 and 3%, based on total compound weight (equivalent to 1.6, 3.1 and 9.3% based on 70/45 gum weight).

Samples of each of the above stabilized blends, including unstabilized controls, were mixed with 5 and 20 parts carbon black Sterling SO-1 (N-539, particle size- 79 m$\mu$, surface area - 42 m$^2$/g, DP-109). In addition, unstabilized controls were mixed with 5 and 20 parts carbon black Philblack-A (N-550, particle size - 41 m$\mu$, surface area - 41 m$^2$/g, DP-114). Sample pads (60 mil) of blends with and without carbon black were compression molded (300° F.), initial stress-strain obtained and the samples exposed to weatherometer aging. Stress-strain properties were obtained after 100, 200 and 400 hours exposure on samples without carbon black and after 200, 400 and 1000 hours on samples with carbon black.

Stress-strain data are summarized in Table V (503X and 503XO, NO carbon black, Examples 1-8) Table VI (503X, Sterling, Examples 9-16), Table VII, (503XO, Sterling, Examples 17-24) and Table VIII (503X and 503XO, Philblack-A, Examples 25-28).

The addition of UV 1084 lowers modulus and increases elongation of the compounds in proportion to the amount of stabilizer incorporated. Incorporation of carbon black increases modulus and lowers elongation.

The data in Table V, weatherometer exposure of 503X and 503XO Compounds with and without UV 1084 Stabilizer, NO carbon black, are included so as to compare the effect on stress-strain properties of weatherometer aging without carbon black. These samples were exposed to a maximum of 400 hours in the weatherometer. This data shows the stabilization effect of the UV 1084 on tensile properties as well as a dramatic increase in modulus (crosslinking) with exposure. With the addition of carbon black, even the unstabilized compounds still retain 85% or more of their tensile strength up to 1000 hours exposure. The increase in modulus along with a decrease in elongation also occurs.

Similar effects of weatherometer exposure are obtained for compounds containing Philblack-A. Comparing the stress-strain data for Sterling and Philback-A samples at the 5 phr level we observe that the increase in modulus with exposure is not as large with Philback-A.

Compression set (R.T.) values before and after 1000 hours exposure are shown in Table IX. In all cases, compression set has been reduced by almost ½ after 1000 hours of weatherometer exposure. Also noted is the substantially higher set obtained with the incorporation of UV 1084, both before and after exposure as compared to the unstabilized blends. The incorporation of carbon black into Thionic 503X and 503XO compounds stabilizes against tensile property deterioration upon exposure to weatherometer aging. Crosslinking, surprisingly still is obtained, resulting in an increase in modulus and an improvement of compression set properties. The incorporation of UV 1084 lowers the modulus and increases compression set of the compounds prior to aging. Both of these latter results obviously are undesireable, and therefore the instant invention is especially valuable is not adversely lowering modulus, but decreasing (improving) compression set while simultaneously giving good accelerated weathering performance.

TABLE IV

| 503X and 503XO FORMULATIONS | | |
|---|---|---|
| Ingredient | 503X | 503XO |
| 70/45 Sulfo-EPDM[a] | 112.5g | 112.5g |
| Sunpar 2280 | 80g | — |
| Sunpar 180 | — | 80g |
| Purecal U | 85g | 85g |
| Icecap K | 60g | 60g |
| ZnO | 6g | 6g |
| Mg(OH)$_2$ | 1.2g | 1.2g |
| ZnST$_2$[b] | 5g | 5g |

[a] 70/45 Sulfo-EPDM is a sulfonated EPDM whose preparation is detailed in copending applications having a sulfonate content of 33 milliequivalents of sulfonic acid per 100 gms of EPDM, neutralized with 70 milliequivalents of zinc/acetate, to which 45 milliequivalents of stearic acid are added as a suitable plasticizer.
[b] Zn(ST)$_2$ is zinc stearate incorporated as additional plasticizer.

TABLE V

WEATHEROMETER AGING THIONIC 503X AND 503XO WITH 0, 0.5, 1, 3% UV 1084 AND NO CARBON BLACK

| Example | Cpd | % UV 1084 | Hours Aged | 100% Mod. | % | 300% Mod. | % | Tensile | % | Elong. | % | Tensile x Elong. |
|---|---|---|---|---|---|---|---|---|---|---|---|---|
| 1 | 503X | 0 | 0 | 259 | — | 373 | — | 808 | — | 650 | — | 5250 |
| | | | 100 | 240 | 93 | 321 | 86 | 408 | 50 | 517 | 80 | 2110 |
| | | | 200 | 245 | 95 | 321 | 86 | 342 | 42 | 437 | 67 | 1495 |
| | | | 400 | 276 | 107 | — | — | 263 | 33 | 105 | 16 | 276 |
| 2 | 503X | 0.5 | 0 | 239 | — | 350 | — | 773 | — | 640 | — | 4947 |
| | | | 100 | 238 | 100 | 336 | 96 | 510 | 66 | 530 | 83 | 2703 |
| | | | 200 | 259 | 108 | 380 | 109 | 489 | 63 | 480 | 75 | 2347 |
| | | | 400 | 364 | 152 | — | — | 417 | 54 | 190 | 30 | 792 |
| 3 | 503X | 1 | 0 | 234 | — | 329 | — | 857 | — | 645 | — | 5528 |
| | | | 100 | 241 | 103 | 338 | 103 | 527 | 61 | 537 | 83 | 2830 |
| | | | 200 | 261 | 112 | 400 | 122 | 592 | 69 | 513 | 80 | 3037 |
| | | | 400 | 377 | 161 | — | — | 528 | 62 | 285 | 44 | 1505 |
| 4 | 503X | 3 | 0 | 194 | — | 287 | — | 735 | — | 627 | — | 4608 |
| | | | 100 | 179 | 92 | 255 | 89 | 597 | 81 | 567 | 90 | 3385 |
| | | | 200 | 201 | 104 | 300 | 105 | 528 | 72 | 543 | 87 | 2867 |
| | | | 400 | 317 | 163 | 523 | 182 | 615 | 84 | 397 | 63 | 2442 |
| 5 | 503XO | 0 | 0 | 250 | — | 367 | — | 787 | — | 640 | — | 5037 |
| | | | 100 | 240 | 96 | 329 | 90 | 405 | 51 | 510 | 80 | 2066 |
| | | | 200 | 246 | 98 | 329 | 90 | 316 | 40 | 320 | 50 | 1011 |
| | | | 400 | — | — | — | — | 272 | 35 | 73 | 11 | 199 |
| 6 | 503XO | 0.5 | 0 | 228 | — | 330 | — | 712 | — | 633 | — | 4507 |
| | | | 100 | 235 | 103 | 338 | 102 | 423 | 59 | 450 | 71 | 1904 |
| | | | 200 | 240 | 105 | 368 | 112 | 538 | 76 | 533 | 84 | 2868 |
| | | | 400 | 331 | 145 | — | — | 402 | 56 | 200 | 32 | 804 |
| 7 | 503XO | 1 | 0 | 207 | — | 302 | — | 728 | — | 637 | — | 4637 |
| | | | 100 | 233 | 113 | 345 | 114 | 533 | 73 | 510 | 80 | 2718 |
| | | | 200 | 246 | 119 | 378 | 125 | 593 | 81 | 533 | 84 | 3161 |
| | | | 400 | 349 | 169 | — | — | 508 | 70 | 283 | 44 | 1438 |
| 8 | 503XO | 3 | 0 | 175 | — | 257 | — | 632 | — | 613 | — | 3874 |
| | | | 100 | 175 | 100 | 260 | 101 | 561 | 89 | 600 | 98 | 3366 |
| | | | 200 | 195 | 111 | 282 | 110 | 585 | 93 | 607 | 99 | 3551 |
| | | | 400 | 305 | 174 | 509 | 198 | 738 | 117 | 470 | 77 | 3469 |

TABLE VI

WEATHEROMETER AGING THIONIC 503X WITH 0, 0.5, 1, 3% UV 1084 AND 5, 20 PHR STERLING SO-1

| Example | Cpd | UV 1084 | phr Sterling SO-1 | Hours Aged | 100% Mod. | % | 300% Mod. | % | Tensile | % | Elong. | % | Tensile x Elong. |
|---|---|---|---|---|---|---|---|---|---|---|---|---|---|
| 9 | 503X | 0 | 5 | 0 | 288 | — | 489 | — | 820 | — | 533 | — | 4371 |
| | | | | 200 | 364 | 126 | 703 | 144 | 865 | 105 | 408 | 77 | 3529 |
| | | | | 400 | 373 | 130 | 656 | 134 | 761 | 93 | 375 | 70 | 2854 |
| | | | | 1000 | 357 | 124 | 621 | 127 | 697 | 85 | 360 | 68 | 2509 |
| 10 | 503X | 0.5 | 5 | 0 | 276 | — | 448 | — | 798 | — | 577 | — | 4604 |
| | | | | 200 | 391 | 142 | 696 | 155 | 825 | 103 | 380 | 66 | 3135 |
| | | | | 400 | 396 | 143 | — | — | 573 | 72 | 247 | 43 | 1415 |
| | | | | 1000 | 375 | 136 | 630 | 141 | 784 | 98 | 410 | 71 | 3214 |
| 11 | 503X | 1 | 5 | 0 | 236 | — | 387 | — | 826 | — | 625 | — | 5163 |
| | | | | 200 | 348 | 147 | 647 | 167 | 876 | 106 | 425 | 68 | 2723 |
| | | | | 400 | 365 | 155 | 631 | 163 | 746 | 90 | 393 | 63 | 2932 |
| | | | | 1000 | 351 | 149 | 601 | 155 | 767 | 93 | 423 | 68 | 3244 |
| 12 | 503X | 3 | 5 | 0 | 175 | — | 275 | — | 846 | — | 677 | — | 5727 |
| | | | | 200 | 286 | 163 | 513 | 187 | 771 | 91 | 460 | 68 | 3547 |
| | | | | 400 | 321 | 183 | 557 | 203 | 783 | 93 | 440 | 65 | 3445 |
| | | | | 1000 | 319 | 182 | 546 | 199 | 741 | 88 | 430 | 64 | 3186 |

TABLE VI-continued

WEATHEROMETER AGING THIONIC 503X
WITH 0, 0.5, 1, 3% UV 1084 AND 5, 20 PHR STERLING SO-1

| Example | Cpd | UV 1084 | phr Sterling SO-1 | Hours Aged | 100% Mod. | % | 300% Mod. | % | Tensile | % | Elong. | % | Tensile x Elong. |
|---|---|---|---|---|---|---|---|---|---|---|---|---|---|
| 13 | 503X | 0 | 20 | 0 | 332 | — | 533 | — | 772 | — | 490 | — | 3783 |
|  |  |  |  | 200 | 440 | 133 | 782 | 147 | 819 | 106 | 330 | 67 | 2703 |
|  |  |  |  | 400 | 438 | 132 | 764 | 143 | 861 | 112 | 380 | 78 | 3272 |
|  |  |  |  | 1000 | 427 | 129 | 721 | 135 | 777 | 101 | 355 | 72 | 2758 |
| 14 | 503X | 0.5 | 20 | 0 | 306 | — | 504 | — | 802 | — | 540 | — | 4331 |
|  |  |  |  | 200 | 427 | 140 | 769 | 153 | 803 | 100 | 330 | 61 | 2650 |
|  |  |  |  | 400 | 439 | 144 | 763 | 151 | 841 | 105 | 360 | 67 | 3028 |
|  |  |  |  | 1000 | 428 | 140 | 725 | 144 | 791 | 99 | 357 | 66 | 2824 |
| 15 | 503X | 1 | 20 | 0 | 263 | — | 421 | — | 741 | — | 563 | — | 4172 |
|  |  |  |  | 200 | 402 | 153 | 726 | 172 | 848 | 114 | 383 | 68 | 3248 |
|  |  |  |  | 400 | 424 | 161 | 736 | 175 | 830 | 112 | 370 | 66 | 3071 |
|  |  |  |  | 1000 | 421 | 160 | 708 | 168 | 759 | 102 | 340 | 60 | 2581 |
| 16 | 503X | 3 | 20 | 0 | 197 | — | 316 | — | 842 | — | 657 | — | 5532 |
|  |  |  |  | 200 | 355 | 180 | 624 | 197 | 842 | 100 | 447 | 68 | 3764 |
|  |  |  |  | 400 | 377 | 191 | 642 | 203 | 821 | 98 | 423 | 64 | 3473 |
|  |  |  |  | 1000 | 371 | 188 | 631 | 200 | 791 | 94 | 407 | 62 | 3219 |

TABLE VII

WEATHEROMETER AGING THIONIC 503XO
WITH 0, 0.5, 1, 3% UV 1084 AND 5, 10 PHR STERLING SO-1

| Example | cpd | % UV 1084 | phr Sterling SO-1 | Hours Aged | 100% Mod. | % | 300% Mod. | % | Tensile | % | Elong. | % | Tensile x Elong. |
|---|---|---|---|---|---|---|---|---|---|---|---|---|---|
| 17 | 503XO | 0 | 5 | 0 | 263 | — | 416 | — | 585 | — | 480 | — | 2808 |
|  |  |  |  | 200 | 381 | 145 | — | — | 626 | 107 | 260 | 54 | 1628 |
|  |  |  |  | 400 | 372 | 141 | 633 | 152 | 687 | 116 | 340 | 71 | 2305 |
|  |  |  |  | 1000 | 356 | 135 | 607 | 146 | 776 | 133 | 425 | 89 | 2398 |
| 18 | 503XO | 0.5 | 5 | 0 | 227 | — | 371 | — | 809 | — | 613 | — | 4959 |
|  |  |  |  | 200 | 355 | 156 | 642 | 173 | 885 | 109 | 450 | 73 | 3983 |
|  |  |  |  | 400 | 347 | 153 | 626 | 169 | 738 | 91 | 410 | 67 | 3026 |
|  |  |  |  | 1000 | 357 | 157 | 586 | 158 | 635 | 78 | 340 | 55 | 2159 |
| 19 | 503XO | 1 | 5 | 0 | 206 | — | 337 | — | 785 | — | 650 | — | 5103 |
|  |  |  |  | 200 | 341 | 166 | 606 | 180 | 679 | 86 | 350 | 54 | 2377 |
|  |  |  |  | 400 | 365 | 177 | 622 | 185 | 813 | 104 | 430 | 66 | 3496 |
|  |  |  |  | 1000 | 346 | 168 | 570 | 169 | 677 | 86 | 385 | 59 | 2606 |
| 20 | 503XO | 3 | 5 | 0 | 166 | — | 261 | — | 670 | — | 645 | — | 4322 |
|  |  |  |  | 200 | 265 | 160 | 472 | 181 | 685 | 102 | 435 | 67 | 2980 |
|  |  |  |  | 400 | 297 | 179 | 497 | 190 | 753 | 112 | 465 | 72 | 3501 |
|  |  |  |  | 1000 | 305 | 184 | 495 | 190 | 714 | 107 | 447 | 69 | 3192 |
| 21 | 503XO | 0 | 20 | 0 | 311 | — | 504 | — | 783 | — | 527 | — | 4126 |
|  |  |  |  | 200 | 450 | 145 | 788 | 156 | 886 | 113 | 355 | 67 | 3145 |
|  |  |  |  | 400 | 447 | 144 | 756 | 150 | 862 | 110 | 380 | 72 | 3276 |
|  |  |  |  | 1000 | 442 | 142 | — | — | 672 | 86 | 290 | 55 | 1949 |
| 22 | 503XO | 0.5 | 20 | 0 | 286 | — | 451 | — | 769 | — | 545 | — | 4191 |
|  |  |  |  | 200 | 460 | 161 | 756 | 168 | 808 | 105 | 337 | 62 | 2723 |
|  |  |  |  | 400 | 455 | 159 | 729 | 162 | 823 | 107 | 380 | 70 | 3127 |
|  |  |  |  | 1000 | 453 | 158 | 715 | 159 | 761 | 99 | 343 | 63 | 2610 |
| 23 | 503XO | 1 | 20 | 0 | 254 | — | 401 | — | 788 | — | 613 | — | 4830 |
|  |  |  |  | 200 | 431 | 170 | 737 | 184 | 895 | 114 | 410 | 67 | 3670 |
|  |  |  |  | 400 | 435 | 171 | 732 | 183 | 870 | 110 | 397 | 65 | 3454 |
|  |  |  |  | 1000 | 434 | 171 | 704 | 176 | 788 | 100 | 367 | 60 | 2892 |
| 24 | 503XO | 3 | 20 | 0 | 214 | — | 342 | — | 816 | — | 643 | — | 5247 |
|  |  |  |  | 200 | 359 | 168 | 597 | 175 | 807 | 99 | 440 | 68 | 3551 |
|  |  |  |  | 400 | 370 | 173 | 616 | 180 | 775 | 95 | 415 | 65 | 3216 |
|  |  |  |  | 1000 | 401 | 187 | 639 | 187 | 713 | 87 | 357 | 56 | 2345 |

TABLE VIII

WEATHEROMETER AGING THIONIC 503X, 503XO
WITH 5 AND 20 PHR PHILBLACK A

| Example | cpd | phr Philblack A | Hours Aged | 100% Mod. | % | 300% Mod. | % | Tensile | % | Elong. | % | Tensile x Elong. |
|---|---|---|---|---|---|---|---|---|---|---|---|---|
| 25 | 503X | 5 | 0 | 321 | — | 532 | — | 836 | — | 523 | — | 4372 |
|  |  |  | 200 | 343 | 107 | 616 | 116 | 769 | 92 | 413 | 79 | 3176 |
|  |  |  | 400 | 423 | 132 | 747 | 140 | 784 | 94 | 340 | 65 | 2666 |
|  |  |  | 1000 | 402 | 125 | 684 | 129 | 767 | 92 | 380 | 73 | 2915 |
| 26 | 503X | 20 | 0 | 365 | — | 581 | — | 767 | — | 460 | — | 3528 |
|  |  |  | 200 | 410 | 112 | 715 | 123 | 805 | 105 | 377 | 82 | 3035 |
|  |  |  | 400 | 470 | 129 | 826 | 142 | 827 | 108 | 307 | 67 | 2539 |
|  |  |  | 1000 | 475 | 130 | 775 | 133 | 773 | 101 | 300 | 65 | 2319 |
| 27 | 503XO | 5 | 0 | 306 | — | 492 | — | 831 | — | 547 | — | 4546 |

TABLE VIII-continued
WEATHEROMETER AGING THIONIC 503X, 503XO WITH 5 AND 20 PHR PHILBLACK A

| Example | cpd | phr Philblack A | Hours Aged | 100% Mod. | % | 300% Mod. | % | Tensile | % | Elong. | % | Tensile x Elong. |
|---|---|---|---|---|---|---|---|---|---|---|---|---|
|  |  |  | 200 | 330 | 108 | 578 | 117 | 855 | 103 | 500 | 91 | 4275 |
|  |  |  | 400 | 396 | 129 | 719 | 146 | 869 | 105 | 423 | 77 | 3676 |
|  |  |  | 1000 | 372 | 122 | 634 | 129 | 787 | 95 | 420 | 77 | 3305 |
| 28 | 503XO | 20 | 0 | 343 | — | 539 | — | 775 | — | 505 | — | 3914 |
|  |  |  | 200 | 381 | 111 | 648 | 120 | 820 | 106 | 440 | 87 | 3608 |
|  |  |  | 400 | 482 | 141 | 803 | 149 | 840 | 108 | 340 | 67 | 2856 |
|  |  |  | 1000 | 484 | 141 | 778 | 144 | 828 | 107 | 347 | 69 | 2873 |

TABLE IX
COMPRESSION SET (R.T.) 503X, 503XO THIONICS WITH STABILIZER UV 1084 AND CARBON BLACKS 100 HOURS WEATHEROMETER EXPOSURE

| Example | Compound | % UV 1084 | Carbon Black | Parts Black | Compression Set (30 min.) Hours in Weatherometer 0 | 1000 |
|---|---|---|---|---|---|---|
|  | 503X | 0 | — | — | 42 | — |
| 9 | " | 0 | Sterling SO-1 | 5 | 25 | 16 |
| 13 | " | 0 | " | 20 | 25 | 10 |
| 25 | " | 0 | Philblack A | 5 | 35 | 16 |
| 26 | " | 0 | " | 20 | 34 | 11 |
| 4 | " | 3 | — | — | 70 | — |
| 12 | " | 3 | Sterling SO-1 | 5 | 64 | 35 |
| 16 | " | 3 | — | 20 | 63 | 33 |
| 5 | 503XO | 0 | — | — | 39 | — |
| 17 | " | 0 | Sterling SO-1 | 5 | 32 | 16 |
| 21 | " | 0 | " | 20 | 28 | 12 |
| 27 | " | 0 | Philblack A | 5 | 39 | 16 |
| 28 | " | 0 | " | 20 | 37 | 12 |
| 8 | " | 3 | — | — | 70 | — |
| 20 | " | 3 | Sterling SO-1 | 5 | 62 | 36 |
| 24 | " | 3 | " | 20 | 71 | 38 |

What is claimed is

1. An elastomeric blend composition which consists essentially of:
   (a) a neutralized sulfonated elastomeric polymer having about 15 to about 50 meq. neutralized sulfonate groups per 100 grams of said neutralized sulfonated elastomeric polymer, said neutralized sulfonate groups containing a counterion selected from the group consisting of ammonium, antimony, aluminum, iron, and a metal of Groups IA, IIA, IB and IIB of the Periodic Table of Elements and mixtures thereof;
   (b) about 5 to about 100 parts by weight of a non-polar process oil per 100 parts by weight of said neutralized sulfonated elastomeric polymer, said non-polar process oil having less than about 2 weight % polar-type compounds;
   (c) about 25 to about 200 parts by weight of at least one inorganic filler per 100 parts by weight of said neutralized sulfonated elastomeric polymer, said inorganic filler being selected from the group consisting of aluminum silicate, talc, calcium silicate, calcium carbonate, and magnesium silicate and mixtures thereof, a ratio of said inorganic filler to said non-polar process oil being from about 1 to about 5;
   (d) about 1 to about 50 parts by weight of a carbon black having a particle size of about 0.02 to about 0.5 microns per 100 parts by weight of said neutralized sulfonated elastomeric polymer, a ratio of said inorganic filler to said carbon black being from about 150:1 to about 0:1; and
   (e) about 5 to about 60 parts by weight of a preferential plasticizer per 100 parts by weight of said neutralized sulfonated elastomeric polymer, said preferential plasticizer being a combination of a carboxylic acid having about 5 to about 30 carbon atoms and a basic salt of said carboxylic acid wherein a metal ion of said basic salt is selected from the group consisting of lead, antimony, aluminum and metals of Groups IA, IB, IIA, and IIB of the Periodic Table of Elements and mixtures thereof.

2. A composition according to claim 1, wherein said neutralized sulfonated elastomeric polymer is derived from an EPDM terpolymer having a Mooney viscosity (M.L., 1+8, 212° F.) of about 5 to about 60.

3. A composition according to claim 2, wherein said composition contains at least 7 parts by weight of said preferential plasticizer per 100 parts by weight of said neutralized sulfonated elastomeric polymer.

4. A composition according to claim 3, wherein said EPDM terpolymer consists essentially of about 40 to about 80 wt. % of ethylene, of about 10 to about 53 wt. % of propylene and of about 1 to about 10 wt. % of a non-conjugated diene.

5. A composition according to claim 4 wherein said non-conjugated diene is selected from the group consisting of 1,4-hexidiene, dicyclopentadiene, alkylidene substituted norbornenes, alkenyl substituted norbornenes and tetrahydroindene.

6. A composition according to claim 4, wherein said non-conjugated diene is 5-ethylidene-2-norbornene.

7. A composition according to claim 1 wherein said basic salt is selected from the group consisting of zinc stearate, barium stearate, lead stearate, magnesium stearate, and sodium stearate.

8. A composition according to claim 1, wherein said filler has an oil absorption of about 10 to about 120.

9. A composition according to claim 1, wherein said non-polar process oil is selected from the group consisting of paraffinic, naphthenic and aromatics and mixtures thereof.

10. A composition according to claim 1, wherein said non-polar process oil is paraffinic having an Mn of about 400 to about 1000.

11. A composition according to claim 1, wherein said inorganic filler has a particle size of about 0.03 to about 15 microns.

12. A composition according to claim 1, wherein said preferential plasticizer is a combination of zinc stearate and stearic acid.

13. An elastomeric formed article according to claim 1, wherein said EPDM terpolymer has an $\overline{Mn}$ of about 10,000 to about 200,000.

14. An elastomeric blend composition according to claim 1, wherein said EPDM terpolymer has an $\overline{M}n$ of about 10,000 to about 200,000.

15. A blend composition according to claim 1, wherein said blend composition has been fabricated and has a compression set at room temperature (recovered from 30') equal to or less than 35%, said fabricated composition having been exposed to U.V. or visible light.

16. A blend composition according to claim 15, wherein said neutralized sulfonated elastomeric polymer is an EPDM terpolymer.

17. An elastomeric formed article being formed from an elastomeric blend composition which consists essentially of:
(a) a neutralized sulfonated elastomeric polymer having about 15 to about 50 meq. neutralized sulfonate groups per 100 grams of said neutralized sulfonated elastomeric polymer, said neutralized sulfonate groups containing a counterion selected from the group consisting of ammonium, antimony, aluminum, iron, and a metal of Groups IA, IIA, IB and IIB of the Periodic Table of Elements and mixtures thereof;
(b) about 5 to about 100 parts by weight of a non-polar process oil per 100 parts by weight of said neutralized sulfonated elastomeric polymer, said non-polar process oil having less than about 2 weight % polar-type compounds;
(c) about 25 to about 200 parts by weight of at least one inorganic filler per 100 parts by weight of said neutralized sulfonated elastomeric polymer, said inorganic filler being selected from the group consisting of aluminum silicate, talc, calcium slicate, calcium carbonate, and magnesium silicate and mixtures thereof, a ratio of said inorganic filler to said non-polar process oil being from about 1 to about 5;
(d) about 1 to about 50 parts by weight of a carbon black having a particle size of about 0.02 to about 0.5 microns per 100 parts by weight of said neutralized sulfonated elastomeric polymer, a ratio of said inorganic filler to said carbon black being from about 150:1 to about 0:1; and
(e) about 5 to about 60 parts by weight of a preferential plasticizer per 100 parts by weight of said neutralized sulfonated elastomeric polymer, said preferential plasticizer being a combination of a carboxylic acid having about 5 to about 30 carbon atoms and a basic salt of said carboxylic acid wherein a metal ion of said basic salt is selected from the group consisting of lead, antimony, aluminum and Groups IA, IB, IIA, and IIB of the Periodic Table of Elements and mixtures thereof.

18. An elastomeric formed article according to claim 17, wherein said neutralized sulfonated elastomeric polymer is derived from an EPDM terpolymer having Mooney viscosity (M.L, 1+8, 212° F.) of about 5 to about 60.

19. An elastomeric formed article according to claim 17, wherein said composition contains at least 7 parts by weight of said preferential plasticizer per 100 parts by weight of said neutralized sulfonated elastomeric polymer.

20. An elastomeric formed article according to claim 17, wherein said basic salt is selected from the group consisting of zinc stearate, barium stearate, lead stearate, magnesium stearate, and sodium stearate.

21. An elastomeric formed article according to claim 18, wherein said preferential plasticizer is a combination of zinc stearate and stearic acid.

22. An elastomeric formed article according to claim 18, wherein said EPDM terpolymer consists essentially of about 40 to about 80 wt. % of ethylene, of about 10 to about 53 wt. % of propylene and of about 1 to about 10 wt. % of a non-conjugated diene.

* * * * *